M. R. FREEMANN.

Improvment in Carriage Axles.

105793

PATENTED JUL 26 1870

Witnesses:
Chas Jacobs
J. V. White

Inventor:
Matthew R. Freemann
per
T. H. Alexander
Atty.

United States Patent Office.

MATTHEW ROSS FREEMAN, OF MACON, GEORGIA.

Letters Patent No. 105,793, dated July 26, 1870.

IMPROVEMENT IN CARRIAGE-AXLES.

The Schedule referred to in these Letters Patent and making part of the same

To all whom it may concern:

Be it known that I, MATTHEW ROSS FREEMAN, of Macon, in the county of Bibb and State of Georgia, have invented certain new and useful Improvements in Axles for Vehicles; and do hereby declare the following to be a full, clear, and exact description thereof, reference being had to the accompanying drawings and to the letters of reference marked thereon, forming a part of this specification.

The nature of my invention consists in the construction and arrangement of a double or compound axle, applicable to all vehicles on wheels, including railroad cars.

In order to enable others skilled in the art to which my invention appertains to make and use the same, I will now proceed to describe its construction and operation, referring to the annexed drawings, in which—

Figure 1:
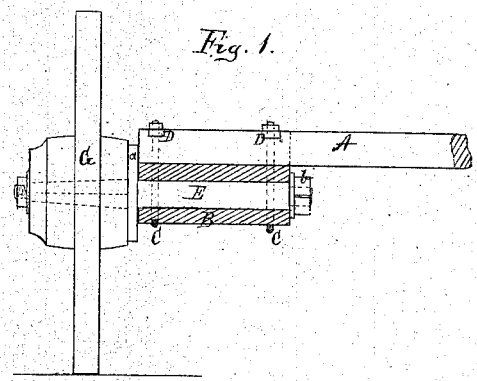
Figure 2:
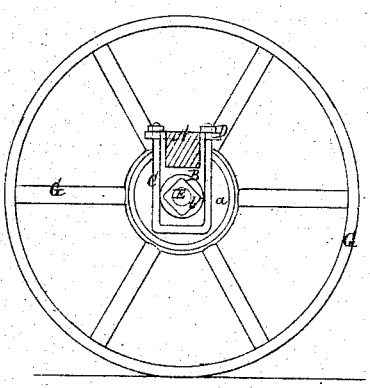

Figure 1 is a front view, part in section, and
Figure 2 is a cross-section.

A represents the main axle, which may be made of wood or iron, according to the kind of vehicle where it is to be used.

At the end of the axle A, on the under side, is secured a box, B. This box may be of any desired length, and of such width that a groove or recess may be cut longitudinally in its upper side for the axle A to lie in, said groove or recess being of such depth that the upper side of the axle and the upper edges of the box will be even or flush with each other.

The box B is then held by means of two stirrups or bent rods C C, which encircle the box, and one or both of which may rest in transverse grooves cut in the under side of the box.

The upper ends of the rods C C pass through the ends of cross-bars D D, and are secured by nuts, as shown, the bars D D being countersunk in the axle A and upper edges of the box B, so as to present an even surface and prevent slipping.

Lengthwise through the box B, under the axle, is a hole, through which passes the spindle, E, provided with a collar, a, at the outer end of the box B, and held from coming out of the same by a nut, b, at its inner end.

The outer end of the spindle E, outside of the collar a, is square and tapering, so that when the wheel G is put on this end and fastened in the usual manner, the spindle will revolve in the box with the wheel, making, as it were, a solid wheel and spindle.

Washers may be placed upon arm E, so that, in the event of shrinkage of the hub, one or more of the washers may be removed and the wheel forced up further upon the arm.

This arrangement secures lightness of draft and strength of wheel and axle. It gives each wheel an independent motion, which is quite an advantage on railroad coaches, allowing greater speed and less danger on short turns, as each wheel has its own motion independent of the other.

Its application to carriages or wagons can readily be seen, as well as the advantages for repairs on the wheel or box without interfering with the main construction of the vehicle.

Having thus fully described my invention,
What I claim as new, and desire to secure by Letters Patent, is—

1. The box B, provided with a trough or recess for the axle A to rest in, substantially as described.

2. The combination of the axle A, box B, rods C C, bars D D, spindle E, and wheel G, all constructed and arranged substantially as and for the purposes herein set forth.

In testimony whereof I have signed my name to this specification in the presence of two subscribing witnesses.

MATT. R. FREEMAN.

Witnesses:
H. M. GRANNISS,
S. VALENTINE.